United States Patent [19]

Schaeff

[11] 3,802,718
[45] Apr. 9, 1974

[54] SPRING SUSPENSION FOR MOTOR VEHICLE AXLES

[76] Inventor: Friedrich Schaeff, Am Hollberg 16, Bensheim-Auerbach, Germany

[22] Filed: Dec. 30, 1971

[21] Appl. No.: 214,221

[52] U.S. Cl. .............................. 280/124 F, 267/31
[51] Int. Cl. ............................................. B60g 11/46
[58] Field of Search .............................. 280/124 R; 267/15–19, 31, 41, 45, 47, 52, 54, 55, 56, 32

[56] References Cited
UNITED STATES PATENTS

| | | | |
|---|---|---|---|
| 3,434,707 | 3/1969 | Raidel | 267/31 |
| 3,493,222 | 2/1970 | Mathers | 267/54 |

Primary Examiner—Philip Goodman
Attorney, Agent, or Firm—Edwin E. Greigg

[57] ABSTRACT

In a resilient axle suspension there is provided, on each side of the vehicle, an axle bracket formed of a first or conventional leaf spring and a second or parabolic leaf spring substantially parallel with the conventional leaf spring. At one end the springs are rigidly clamped to one another and to an axle tube, whereas at the other end the conventional spring — having a uniform thickness along its length — is attached to the chassis to swing about a pivot without clearance and the parabolic spring — having a thickness increasing along its length towards the axle tube — is attached to the chassis to swing about the same pivot with the possibility of a linear forward and rearward shift with respect to the conventional spring.

18 Claims, 3 Drawing Figures

SPRING SUSPENSION FOR MOTOR VEHICLE AXLES

BACKGROUND OF THE INVENTION

This invention relates to a resilient axle suspension for motor vehicles wherein the axle body — usually an axle tube — is secured to two longitudinal axle brackets which are situated at either side of the vehicle axis and each of which is formed of at least two leaf springs. The suspension finds application particularly in axle assemblies that include air springs; the axles may be either live or non-driven. It also may find application in different types of steering assemblies, such as king pin steering assemblies, steering bolster or steering knuckle assemblies.

When the vehicle axle suspended in the aforeoutlined manner undergoes springing displacements, a differentiation should be made between the case of an equal or uniform springing displacement of both wheels supported by the axle (in such a case the axle tube is shifted parallel to itself) and the case of an unequal or non-uniform springing displacement of the two sides. In case of an unequal springing displacement, the leaf spring pair which is clamped along a portion of its length to the axle tube and which constitutes an axle bracket executes merely a swinging motion about its point of articulation. The springing return force is supplied substantially by the spring system proper, in the present case an air spring assembly. The axle bracket is thus exposed exclusively or almost exclusively to tensional forces.

The conditions in case of unequal springing displacements are different. The terminus of the leaf spring stack (axle bracket) clamped to the axle tube extends approximately tangentially to the axle tube; to each vertical distance of the axle tube from the main vehicle body there corresponds a predetermined angle which the length dimension of the axle bracket forms with the horizontal in the range of the axle tube. In case the axle is sprung unequally (that is, its displacement is not parallel to itself), each leaf spring group forming one axle bracket seeks to assume the aforenoted angle corresponding to the springing displacement on its side. Due to the fact that the two angles on either side of the vehicle are unequal because of the non-uniform springing displacement of the axle tube, the axle brackets exert a torsion moment on the axle tube. Since, however, the axle tube is normally more rigid than the axle brackets, the latter have to yield. Thus, in addition to the normal static bending moment distribution as determined by the distances of the axle tube from the air spring and the articulation of the axle bracket, there appears in each axle bracket a bending moment which urges both axle brackets in the range of the axle tube in the same direction towards the horizontal. The unequal springing displacements have further the effect that the leaf springs also have to follow the oblique inclination of the axle so that they would be twisted in their longitudinal direction if they did not or could not yield at their locus of articulation.

The technical problems involved in the aforeoutlined phenomena are sought to be mastered by avoiding a transmission of torsion moment at the articulation of the axle bracket. It has thus been suggested to support the axle bracket loosely with respect to torsional loads and to provide separate stabilizers for taking up and opposing (resetting) the unequal springing displacements. If the axle bracket is articulated in such a manner that the articulation takes up torsional forces, the axle bracket has to be designed to be very strong. This, however, as a rule, affects its properties as a bending spring. If a parabolic leaf spring is used, the characteristic springing behavior thereof is utilized by placing its weak terminus at the location of articulation. Because of the substantial torsional loads at the articulation, a parabolic spring cannot be used to transmit the lateral guide forces from this articulation to the axle tube.

OBJECT AND SUMMARY OF THE INVENTION

It is an object of the invention to provide an improved axle bracket of the aforenoted type, eliminating the discussed disadvantages and ensuring a lightweight axle suspension with small unsprung masses.

Briefly stated, according to the invention, one of the leaf spring of each axle bracket has a constant moment of resistance along its effective length and is articulated to the main vehicle body by means of a hinge-type joint and has a pivotal axis which is normal to the central plane of the vehicle. Further, a second leaf spring of each axle bracket is a parabolic spring having a moment of resistance that decreases towards the hinge-type articulation. The parabolic spring is supported in the range of the axle bracket articulation in such a manner that it is capable of transmitting at that location vertical forces and forces transversal to the longitudinal axis of the vehicle but, at the same time, by means of a corresponding play at its location of support, avoids the torsional forces acting about the longitudinal direction of the axle bracket.

At their terminus adjacent the axle the springs are clamped to the axle tube, so that a twist about the geometrical axis of the axle tube results in a bending load on the leaf springs. The leaf spring of constant moment of resistance along its length has, in the simplest case, a constant cross section along its length. This leaf spring, hereinafter designated at "conventional" spring, has an eye which surrounds, at the location of articulation, a pivot pin to form a hinge-type articulation. In this manner the conventional leaf spring is capable of transmitting, in the first place, lateral guide forces to the axle in addition to bending and tensional stresses. With respect to the bending forces appearing during springing displacements, the conventional leaf spring is largely relieved by the parabolic leaf spring which on its part, transmit only very small, if any, torsional moments in the articulation. By a parabolic spring there is in general meant a leaf spring the thickness and thus the cross-sectional area of which varies as a parabolic function along its effective length.

The axle tube may be disposed above or below the leaf spring assemblies forming the axle brackets. Particularly in case of live axles, the conventional spring is extended beyond the axle body and its terminus is guided in means permitting longitudinal motion, or is attached to a longitudinally movable support.

The invention will be better understood as well as further objects and advantages will become more apparent from the ensuing detailed specification of several exemplary embodiments taken in conjunction with the drawing.

DESCRIPTION OF THE EMBODIMENTS

Figure 1:
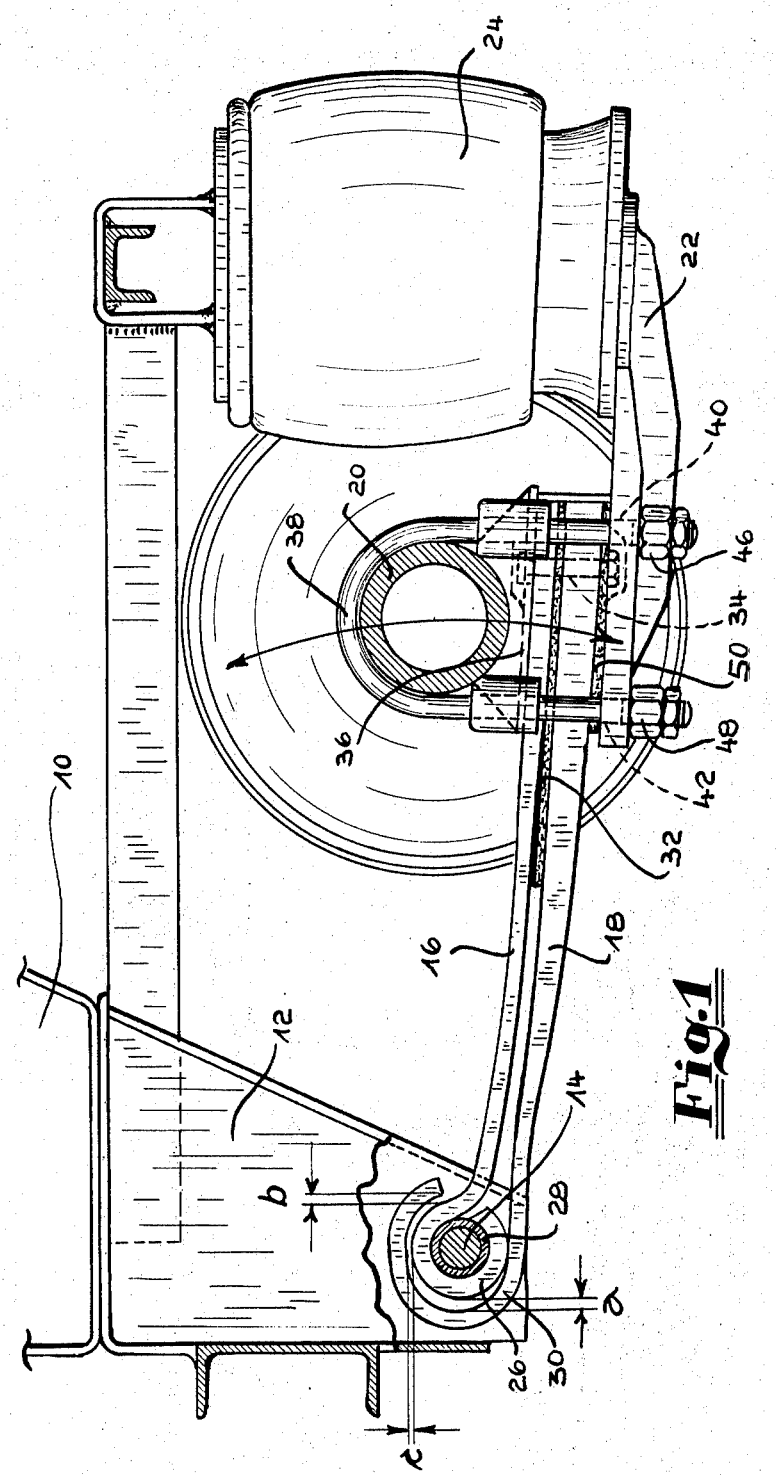
FIG. 1 is a side elevational view of a first embodiment of the invention associated with a non-driven axle assembly.
Figure 3:
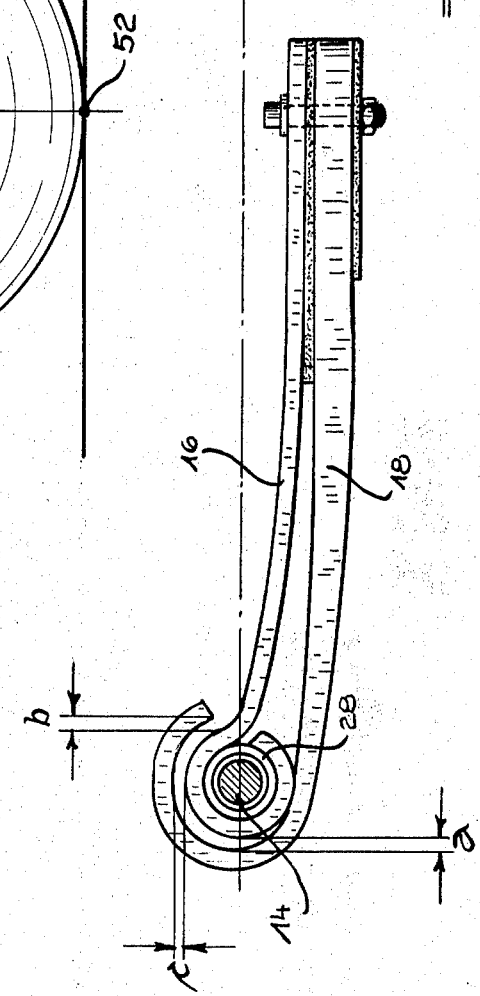

Turning now to FIGS. 1 and 3, to the vehicle chassis 10 there is fixedly attached a support member 12 which carries two pivot pins 14 (only one shown) disposed at both sides of the longitudinal axis of the vehicle and extending normal to the central vehicular plane. To each pin 14 there is articulately attached — in a manner later to be described — an axle bracket formed of leaf springs 16 and 18. The axle bracket 16, 18 is rigidly clamped to the axle body 20 which is formed as a tubular member and which supports the vehicle wheels. Further, a carrier arm 22, extending rearward from the axle tube 20, is clamped to the axle bracket 16, 18 and the axle tube 20. The carrier arm 22 forms the lower support of an air spring 24 which at its upper end is in engagement with the chassis 10. All components hereinbefore described (with the exception of the chassis 10 and the axle tube 20) are duplicated and thus are present on either side of the central vehicular plane. The carrier arms 22 may be connected with one another by means of a transverse bridge member (not shown) which supports the air springs 24.

The conventional leaf spring 16 of the axle bracket 16, 18 has, remote from the axle tube 20, a terminus formed as a spring eye 26 which surrounds without any or without any substantial play a cylindrical sleeve 28. The latter, in turn, surrounds without play the pivot pin 14 about which it may rotate as a unit with the spring eye 26. The conventional leaf spring 16 surrounds the pin 14 along its entire width which is so designed that the joint 26, 28, 14 forms a hinge-type articulation which is also capable of transmitting lateral guide forces between the axle tube 20 and the chassis 10.

The second leaf spring 18 forming the axle bracket 16, 18 is a parabolic spring, the moment of resistance and the moment of inertia of whicn increases from the location of articulation at 14 towards the clamping location at the axle tube 20. Thus, the weakest portion of the spring 18 is situated at the hinge-type articulation 14, 28, 26. This weakest terminus of the parabolic spring 18 is formed as a spring eye 30 which surrounds the spring eye 26 in such a manner that the parabolic spring 18, in case of a uniform springing displacement of the axle at both vehicle sides, need transmit no tensional forces. In case tha axle tube 20, because of unequal springing displacement at the two vehicle sides, changes its normal position with respect to the central vehicular plane and assumes an oblique position with respect thereto, the axle bracket 16, 18 is bent and twisted whereby the center of the spring eye 30 of the parabolic spring 18 shifts with respect to the center of the spring eye 26 of the conventional leaf spring 16. In order to permit the execution of the aforenoted shift, the spring eye 30 has an ellipitcal or oval shape so that in the longitudinal direction of the vehicle (in both forward and rearward directions) there is provided a clearance with respect to the spring eye 26. The clearance in the forward direction is designated at $a$ while the clearance in the rearward direction is designated at $b$. In addition, there is also provided a small vertical clearance $c$ in the upward direction between the two spring eyes 26 and 39, thus, in the direction of the motor axis of the ellipsis formed by the spring eye 30. The magnitude of the clearance $c$ is so designed that the parabolic spring 18 need not transmit any or any unsafe torsional forces through the spring eye 30. Thus, the weak articulated terminus 30 of the parabolic spring 18 is not loaded by torsional forces.

The end portions of the leaf springs 16, 18 remote from the pivot pin 14 are, with the interposition of an insert 32 clamped to one another and to an adjustment plate 36 by means of throughgoing bolts 34. The adjustment plate 36 which is provided with an elongated slot receiving the bolts 34, is, subsequent to an adjusting operation, welded by means of intermediate members to the axle tube 20. The elongated slots in the intermediate members thus serve for an adjustment of the axle bracket with respect to the axle tube. Two U-shaped yokes 38 (only one shown) surround the axle tube 20 in such a manner that the two yokes with their legs flank the spring assembly 16, 18. The legs of each U-yoke 38 pass through bores 40, 42 provided in the carrier arm 22. By means of nuts 46, 48 threaded on the yoke legs extending beyond the carrier arm 22, the yokes 38 clamp the carrier arm 22, the axle bracket 16, 18 and the axle tube 20 rigidly to one another. In this clamped assembly the carrier arm 22 and the leaf spring 18 are separated from one another by an insert 50 which, similarly to the insert 32 disposed between the two springs 16 and 18 may be made of polyamide.

In the aforedescribed assembly the tensional forces, lateral guide forces and torsional forces are taken up by the conventional leaf spring 16 whereas the parabolic spring 18 participates exclusively or almost exclusively in taking up bending forces with its own advantageous bending characteristics.

The parabolic spring 18 serves primarily to stabilize the vehicle about its longitudinal axis, for example, during the negotiation of curves. The spring work is performed preponderantly by the air springs 24.

In case of a breakage of one of the two springs, the remaining spring is adapted to function sufficiently for further emergency travel of the vehicle.

Figure 2:
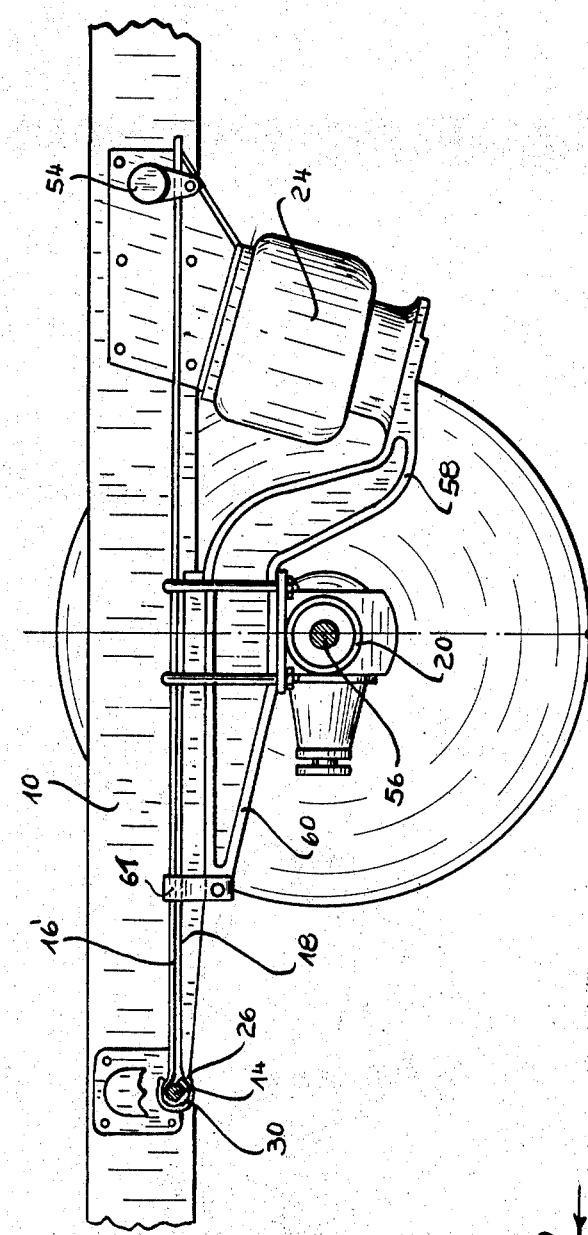
FIG. 2 is a side elevational view of a second embodiment of the invention associated with a live axle assembly and FIG. 3 is a side elevational view on an enlarged scale of a portion common to the structure shown in FIGS. 1 and 2.

Turning now to FIG. 2 there is illustrated an embodiment which is particularly adapted for live axles. In this embodiment the conventional leaf spring 16' is extended beyond the ground support point 52 into the range above the air spring 24. The terminus of the spring 16' is laterally constrained and 54 by maintaining a vertical clearance and a possibility of expansion in the longitudinal direction. This may be effected by means of a scissors-type attachment or simply by means of a face forming part of a guide and disposed laterally of the spring leaf. In the embodiment illustrated, the vehicle axle 56 and thus the axle tube 20 are arranged below the axle bracket 16', 18. The axle bracket itself bridges, as it is customary or necessary in case of live axles, a greater distance than in the case of idle axles. It is therefore expedient to support the axle bracket 16', 18 at a location between its two ends. For this purpose of the carrier arm, here designated at 58, has a forwardly directed extension 60 which, by means of an attachment 61 supports the axle bracket 16', 18 at approximately midway between the location of clamping and the location of articulation. By supporting the parabolic spring at its middle its dimensioning is facilitated.

The aforedescribed suspension for live axles makes possible the use of air springs in vehicles which originally were designed for a leaf spring-type suspension. In this manner the spring characteristics are improved and furthermore, a raising and lowering may be performed for the purpose of replacing the superstructure or parts thereof.

What is claimed is:

1. In a spring suspension for an axle of a motor vehicle having a chassis and an axle body spaced therefrom, the improvement comprising
   A. a hinge means secured to said chassis on either side of the longitudinal central axis of the vehicle,
   B. an axle bracket situated on either side of the longitudinal central axis of the vehicle and extending in the length dimension thereof, each axle bracket having
      1. a first or conventional leaf spring of constant moment of resistance along its effective length, said conventional leaf spring being attached to said hinge means for pivotal motion about an axis normal to the central vehicular plane,
      2. a second or parabolic leaf spring of decreasing moment of resistance along its length towards said hinge means, said parabolic leaf spring being attached to said hinge means with at least a horizontal clearance for permitting, in the length dimension of the vehicle, a shift of said parabolic spring in said hinge means in response to torsional forces acting about the length dimension of said axle bracket, said parabolic spring transmitting in said hinge means vertically directed forces, and
   C. means for securing said conventional spring and said parabolic spring to said axle body.

2. An improvement as defined in claim 1, wherein on either side of the longitudinal axis of the vehicle there is disposed solely one conventional leaf spring of constant moment of resistance.

3. An improvement as defined in claim 1, wherein on either side of the longitudinal axis of the vehicle there is disposed solely one parabolic leaf spring.

4. An improvement as defined in claim 1, wherein on either side of the longitudinal axis of the vehicle there is disposed solely one conventional leaf spring and one parabolic leaf spring.

5. An improvement as defined in claim 1, said conventional leaf spring having a constant cross-sectional configuration along its length.

6. An improvement as defined in claim 1, including

A. a pivot pin forming part of said hinge means,
B. a first spring eye constituting one terminus of said conventional spring, said first spring eye surrounding said pivot pin and
C. a second spring eye constituting one terminus of said parabolic leaf spring, said second spring eye surrounding said first spring eye.

7. An improvement as defined in claim 1, said conventional leaf spring extending above said parabolic leaf spring.

8. An improvement as defined in claim 6, including a vertical clearance between said first and second spring eyes.

9. An improvement as defined in claim 6, including horizontal clearances between said first and second spring eyes in both the forward and the rearward directions of the vehicle.

10. An improvement as defined in claim 1, said means for securing said conventional spring and said parabolic spring to said axle body being formed of a rigid clamping mechanism.

11. An improvement as defined in claim 1, including air spring means in engagement with said chassis and at least indirectly supported by said axle bracket.

12. An improvement as defined in claim 11, including a carrier arm, one associated with each axle bracket, each carrier arm supporting said air spring means and being rigidly clamped together with said conventional and parabolic leaf springs.

13. An improvement as defined in claim 1, each axle bracket extending below said axle body.

14. An improvement as defined in claim 1, each axle bracket extending above said axle body.

15. An improvement as defined in claim 12, said carrier arm having an extension oriented towards said hinge means and connected to said axle bracket between its clamped location and said hinge means to provide a support for said axle bracket.

16. An improvement as defined in claim 15, said extension supporting half o the length of said axle bracket between said axle body and said hinge means nearest to the azle.

17. An improvement as defined in claim 1, wherein said conventional spring extending rearwardly beyond the location of attachment to said axle body, said improvement further includes guide means to guide the terminal portion of said conventional leaf spring remote from said hinge means, said guide means permitting longitudinal motion of said conventional leaf spring and preventing lateral displacements thereof.

18. An improvement as defined in claim 17, said guide means being formed of a longitudinally movable suspension carrying the terminus of said conventional leaf spring remote from said hinge means.

* * * * *

UNITED STATES PATENT OFFICE
CERTIFICATE OF CORRECTION

Patent No. 3,802,718      Dated April 9, 1974

Inventor(s) Friedrich Schaeff

It is certified that error appears in the above-identified patent and that said Letters Patent are hereby corrected as shown below:

In the heading page of the patent insert the following:

[30] FOREIGN APPLICATION PRIORITY DATA

January 2, 1971      Germany      P 21 00 048.6

Signed and sealed this 30th day of July 1974.

(SEAL)
Attest:

McCOY M. GIBSON, JR.
Attesting Officer

C. MARSHALL DANN
Commissioner of Patents